(12) United States Patent
Chu

(10) Patent No.: US 11,432,048 B2
(45) Date of Patent: Aug. 30, 2022

(54) METHOD AND APPARATUS FOR INTERACTIVE TELEVISION GUIDES AND PROGRAM RULES

(71) Applicant: Viva Chu, Old Greenwich, CT (US)

(72) Inventor: Viva Chu, Old Greenwich, CT (US)

( * ) Notice: Subject to any disclaimer, the term of this patent is extended or adjusted under 35 U.S.C. 154(b) by 0 days.

(21) Appl. No.: 16/994,063

(22) Filed: Aug. 14, 2020

(65) Prior Publication Data

US 2021/0006866 A1 Jan. 7, 2021

Related U.S. Application Data

(60) Provisional application No. 62/865,531, filed on Jun. 24, 2019.

(51) Int. Cl.
| | |
|---|---|
| *H04N 21/482* | (2011.01) |
| *H04N 21/485* | (2011.01) |
| *H04N 21/436* | (2011.01) |
| *H04N 21/442* | (2011.01) |

(52) U.S. Cl.
CPC ..... *H04N 21/482* (2013.01); *H04N 21/43615* (2013.01); *H04N 21/44218* (2013.01); *H04N 21/4858* (2013.01)

(58) Field of Classification Search
CPC ............. H04N 21/482; H04N 21/4858; H04N 21/43615; H04N 21/44218; H04N 21/4668; H04N 21/4667; H04N 21/25891; H04N 21/44226; H04N 21/4532; H04N 21/4826; G06N 20/00
See application file for complete search history.

(56) References Cited

U.S. PATENT DOCUMENTS

| | | | | |
|---|---|---|---|---|
| 9,451,196 | B2 * | 9/2016 | Carney | ............. H04N 21/4786 |
| 2008/0092173 | A1 * | 4/2008 | Shannon | .............. H04N 21/482 |
| | | | | 725/47 |
| 2008/0242280 | A1 * | 10/2008 | Shapiro | ............ H04N 21/41407 |
| | | | | 455/414.3 |
| 2009/0199235 | A1 * | 8/2009 | Surendran | ............... G10L 15/26 |
| | | | | 704/E15.005 |
| 2010/0058398 | A1 * | 3/2010 | Ojala | ...................... H04W 4/80 |
| | | | | 725/62 |
| 2011/0289011 | A1 * | 11/2011 | Hull | ...................... G06Q 50/01 |
| | | | | 705/319 |
| 2013/0014223 | A1 * | 1/2013 | Bhatia | .............. H04N 21/42203 |
| | | | | 726/4 |

(Continued)

FOREIGN PATENT DOCUMENTS

WO   WO-0182139 A1 *  11/2001  ........... G06F 40/103

*Primary Examiner* — Fernando Alcon
(74) *Attorney, Agent, or Firm* — John Carpenter

(57) ABSTRACT

Developments in interactive programming guides that utilize a confluence of users/viewers from data that may be blockchain and/or data collection from IoT and other devices, proximity sensing of viewership, and both machine and guided learning over a large dataset to produce rules for AI selection of content, format, and features presented to currently active or a nearby set of television users/viewers. Blockchain may be implemented separately for accounting, verification, billing, and/or fees/royalty payments owed to content owners/copyright holders. Playback may be initiated by a remote device and played on a same or yet another or a plurality of remote devices.

20 Claims, 6 Drawing Sheets

(56) References Cited

U.S. PATENT DOCUMENTS

| | | | |
|---|---|---|---|
| 2013/0339991 A1* | 12/2013 | Ricci | H04N 21/251 |
| | | | 725/14 |
| 2014/0068692 A1* | 3/2014 | Archibong | H04L 67/22 |
| | | | 725/116 |
| 2015/0150031 A1* | 5/2015 | Gibbon | H04N 21/42201 |
| | | | 725/12 |
| 2015/0319403 A1* | 11/2015 | Antipa | H04N 5/445 |
| | | | 386/224 |
| 2016/0112770 A1* | 4/2016 | Harrison | H04L 67/10 |
| | | | 725/31 |
| 2017/0346582 A1* | 11/2017 | Sheppard | H04N 21/262 |
| 2018/0035148 A1* | 2/2018 | Maria | G10L 25/54 |
| 2021/0136458 A1* | 5/2021 | Carney | H04N 21/47202 |

\* cited by examiner

METHOD AND APPARATUS FOR INTERACTIVE TELEVISION GUIDES AND PROGRAM RULES

CROSS REFERENCE TO RELATED APPLICATION

This application is based on and claims priority to U.S. Provisional Patent Application Ser. No. 62/865,531, filed on 24 Jun. 2019, entitled "METHOD AND APPARATUS FOR INTERACTIVE TELEVISION GUIDES AND PROGRAM RULES" which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of Invention

The present invention relates to interactive television (iTV) and particularly the prediction, selection, and display of content and services to viewers.

Discussion of Background

Cable and OTT services are nearly ubiquitous worldwide. They have guide systems that allow users to watch, and record programs. Content selection, interfaces, guides, are formatted or perform per programming and/or programming rules.

SUMMARY OF THE INVENTION

The present inventor has realized the need to improve interactive television operation, program guides, and related services. In one embodiment, the present invention provides an interactive television guide and programming rules. Such provision includes an application layout file associated with a feature related to displayed content, content intended to be displayed, and/or content available for display. The application layout file may be, for example, customized for a respective device platform and a specific actual user or users of the platform. Such customization may include recent activities of a user that intelligently influence decisions as to attributes of display layout or display layout data for rendering features related to the content for the respective device platform.

Various aspects of the present invention may be described a method and apparatus for Artificial Intelligence (AI) based interface and customized rules for various content and features in an interactive TV environment. Various aspects of the invention may be described as a method and apparatus for social media based interactive television programming guide. Various aspects of the invention may be described as a method and apparatus for predicting television content selections and setting up disparate delivery channels including OTT, 5G, Satellite, and broadcast services for delivery of content and programming guides. Various aspects of the invention may be described as a blockchain enabled Electronic Programming Guide (EPG).

Various aspects of the invention may be described as blockchain (or blockchained) training data for machine learning to enable electronic programming guides, rules, and decisions related to content selections and display. Various aspects of the invention may be described as AI, guided learning, and related models for machine learning based feature and content presentation for programming guides.

Various aspects of the invention may be described as data and machine learning models for programming guides on different user devices/smartphones for a same large screen display. Various aspects of the invention may be described as a method and apparatus for accessing content based on proximity of a user or users to a television viewing device.

Various aspects of the invention may be described as an EPG linked dynamic v-chip level effectiveness enabled by a current composition of viewers/users. Various aspects of the invention may be described as a dynamic EPG based on intelligent analysis of a confluence of current users' data (e.g., how the users' data interact and form patterns indicative of content desirable to all current users). Various aspects of the invention may be described as a blockchain royalty and ratings verification of/for user selected content (and/or viewing) from, for example, an electronic programming guide. The royalty may be paid, for example, to content creators or content provider such as YouTube.

Various aspects of the invention may be described as user permissions to collect data from disparate sources for the selection and presentation of programming content in an EPG including authorization derived from a verifiable multi-level privacy-by-design statement including opt-in for the permissions.

In one embodiment the present invention provides an interactive programming guide that is formulated at least in part based on data received from functionally unrelated connected devices, data being useful in establishing any of program format, content, order of display, etc. Such unrelated devices may be IoT devices that communicate with the set-top box or otherwise communicate with a computing device that establishes content and or format of display for television or other programming.

In one embodiment, the present invention includes an interactive programming guide triggered by proximity of a viewer/user or plurality of viewers/potential viewers to a display device. The present invention includes customized application layout files each configured for one or more respective device platforms and one or more users of the device, wherein each of the one or more customized application layout files comprising a structure that indicates attributes of display layout data for rendering a feature related to content for the respective device platform and user. The structure may be, for example, a data structure, blockchain, or data structure in a blockchain. The application files may be customized, for example, with respect to data from either related and/or unrelated connected devices about the user or users.

The present invention includes communicating various data about a user between a series of devices in a blockchain format and communicating the data or decisions/results of AI analysis to a set-top box (STB) or other processing device configured to prepare a menu, selection of content, or features of an interactive programming guide such as a cable television guide. The set-top box (or backend server in communication with the STB), for example, may receive the blockchain (or data from multiple devices) together in a message, data structure, or other communication and utilizes it to determine appropriate content, priority or placement of indicia of the content, or other features of an interactive programming guide.

Such data may include any of recent activities, physical, social media, Internet search data, Alexa data (including data collected while in listening mode), data collected by IoT devices, data collected from open microphones in one or more devices, recent entertainment choices, news, articles read, trending posts in areas of interest, etc. The present invention includes receiving multiple user centric block chains and feeding those chains and/or other data into an AI interface using rules that are validated via machine learning over a large set of the user's or users' data and/or other user's data.

The present invention includes changing the composition of the rules or selected content, layout, or features of the programming guide based on a changing composition of viewers near the display. For example, when a new user enters the room where the display is in use the results, format, and/or features of the program guide may change, be re-arranged, or reformatted.

The present invention includes a personalization of advertising relative to activities one or more users are engaged in at any given time. For example, advertising soda when a user answers the door (or just as or even before the doorbell rings) when pizza is delivered. Mountain bike advertising when one or more users enter the room who recently completed a bike ride (or even a workout) as known from bike connected or bio-metric reporting apps or devices.

The present invention includes data recognized from images and/or sound provided by security cameras, nest-like doorbells, internet appliances, Kinect, and other devices. Text recognition (e.g., reading text on packages being delivered), facial recognition, activity recognizing activity or other content in the images. Such data may be used independently, passed directly to the set-top box or sent to a remote processing device. Such data may be included in a block chain distributed to various computing devices or the set-top box. Such data may be utilized to build a profile of each user or validate user models/profiles. The data may be used in identifying the current mix of viewers. Ultimately, such data, especially more recently retrieved data, drives decisions as to the content, format, and features of the programming guide.

The present invention also includes the production of rules and the establishment of data and relationships for use in rules based decision making, machine learning, deep learning, guided learning, and other forms of artificial intelligence as applied in interactive television, television or programming guides, selections of content, and features of interest related to programming, content, layout, advertising, etc. Such data may include data derived from a soundtrack of past and currently viewed programming, data from non-entertainment devices, data from mobile devices, data from IoT devices, social media, and others. The relationships may include, for example, a relationship between data derived from non-entertainment related equipment and an entertainment center including any of a set-top box, television, mobile devices, mobile device interfaces including remote control applications on a smartphone.

The present invention may be embodied as a device, apparatus, mechanism, process, method, or systems, for example. Portions of the device, method, or other forms of the invention may be conveniently implemented in programming on a general purpose computer, set-top box (STB), mobile phone, or networked computers, and the results may be displayed on an output device connected to any of the above or transmitted to a remote device for output or display. Such output and/or remote device may be, for example, a set-top box and display, personal/notebook computer, smartphone, tablet, etc. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
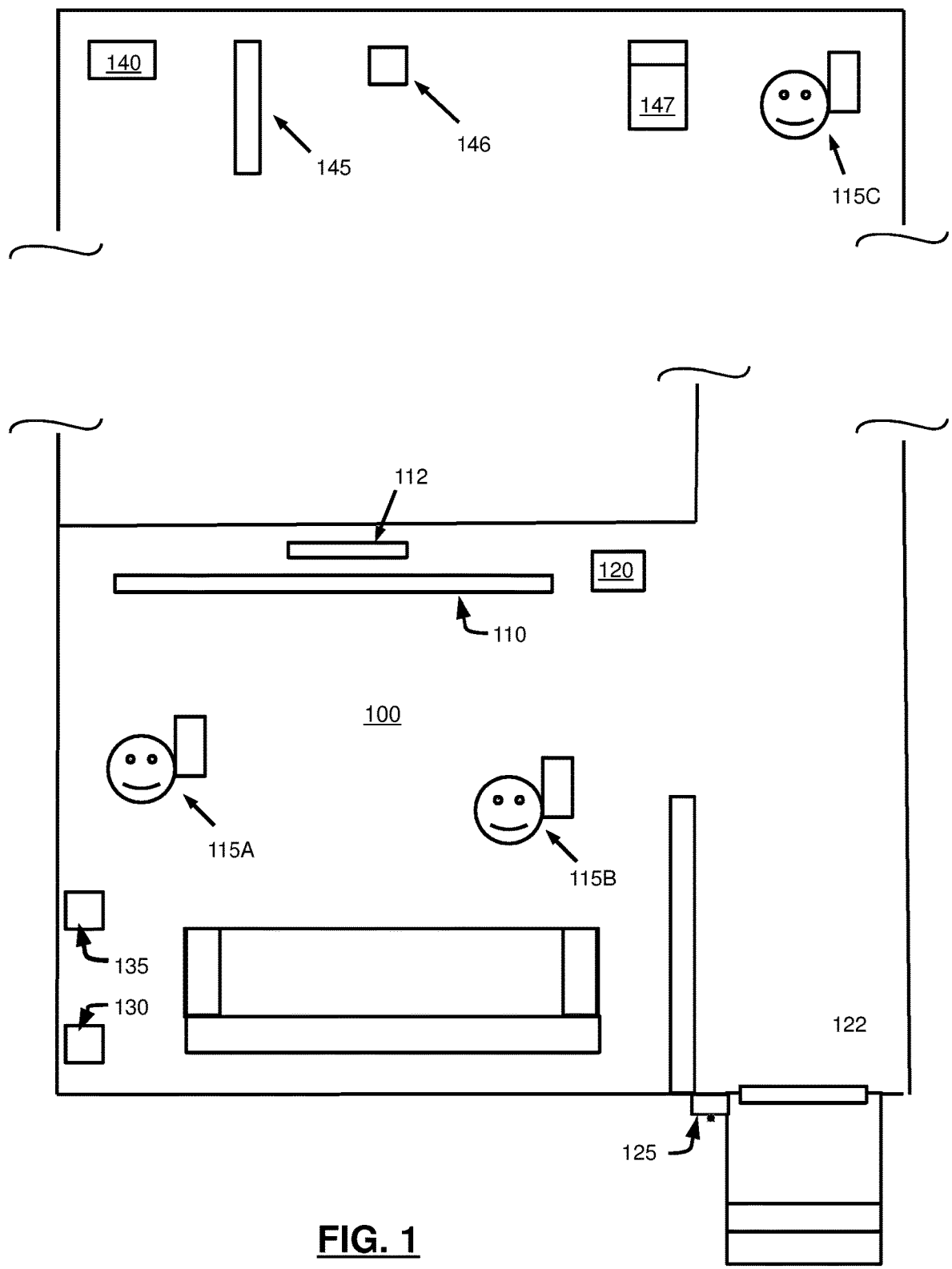
FIG. 1 is a block diagram of an entertainment area according to various embodiments.

Referring now to the drawings, wherein like reference numerals designate identical or corresponding parts, and more particularly to FIG. 1 thereof, there is illustrated an entertainment area 100 of a household, a display 110, users and user devices 115A and 115B, set-top box 120, and various connected devices including nest-type doorbell 125, smoke alarm/motion detector 130, Alexa-like device 135. In other areas of the household, a computer 140, Peloton-like exercise equipment, internet appliance 146, household appliances (e.g., connected refrigerator 147), and user/user device 115C.

In one embodiment the present invention provides an interactive programming guide that is formulated at least in part based on data received from functionally unrelated connected devices, data being useful in established any of program format, content, order of display, etc. Such unrelated devices may be IoT devices that communicate with the set-top box or otherwise communicate with a computing device that establishes content and or format of display for television or other programming.

In one embodiment, the present invention includes an interactive programming guide triggered by proximity of a plurality of viewers/potential viewers to a display device. The present invention includes customized application layout files each configured for one or more respective device platforms and one or more users of the device, wherein each of the one or more customized application layout files comprising a structure that indicates attributes of display layout data for rendering a feature related to content for the respective device platform and user. The structure may be, for example, a data structure or blockchain. The application files may be customized, for example, with respect to data from either related and/or unrelated connected devices about the user or users. The structure's attributes comprise a general location and allows the receiving device to effect actual placement.

The present invention includes communicating various data about a user between a series of devices in a blockchain format and communicating the data to a set-top box or other processing device configured to prepare a menu, selection of content, or features of an interactive programming guide such as a cable television guide. The set-top box, for example, may receive the blockchain (or data from multiple devices) together in a message, data structure, or other communication and utilizes it to determine appropriate content, priority or placement of indicia of the content, or other features of an interactive programming guide (e.g., Electronic Programming Guide (EPG)).

The features may include anything related to the content (e.g., virtual channel, content typically selected by a user, content typically selected by a user during certain days or timeframes, content typically selected by a user based on recent physical or virtual activities of the user, an amalgamation of content or data from websites or various vendors such as eBay, craigslist, Amazon, etc.). The features may also include preferences or items not related to the content such as some forms of advertising.

The data from multiple devices may include data from any recent activities, physical (bike riding, driving, running, dining, shopping, going to the movies), social media, Internet search data, Alexa data (including data collected while in listening mode), data collected by IoT devices, data collected from open microphones in one or more devices, recent entertainment choices, news, articles read, trending posts in areas of interest, etc.

Figure 2:
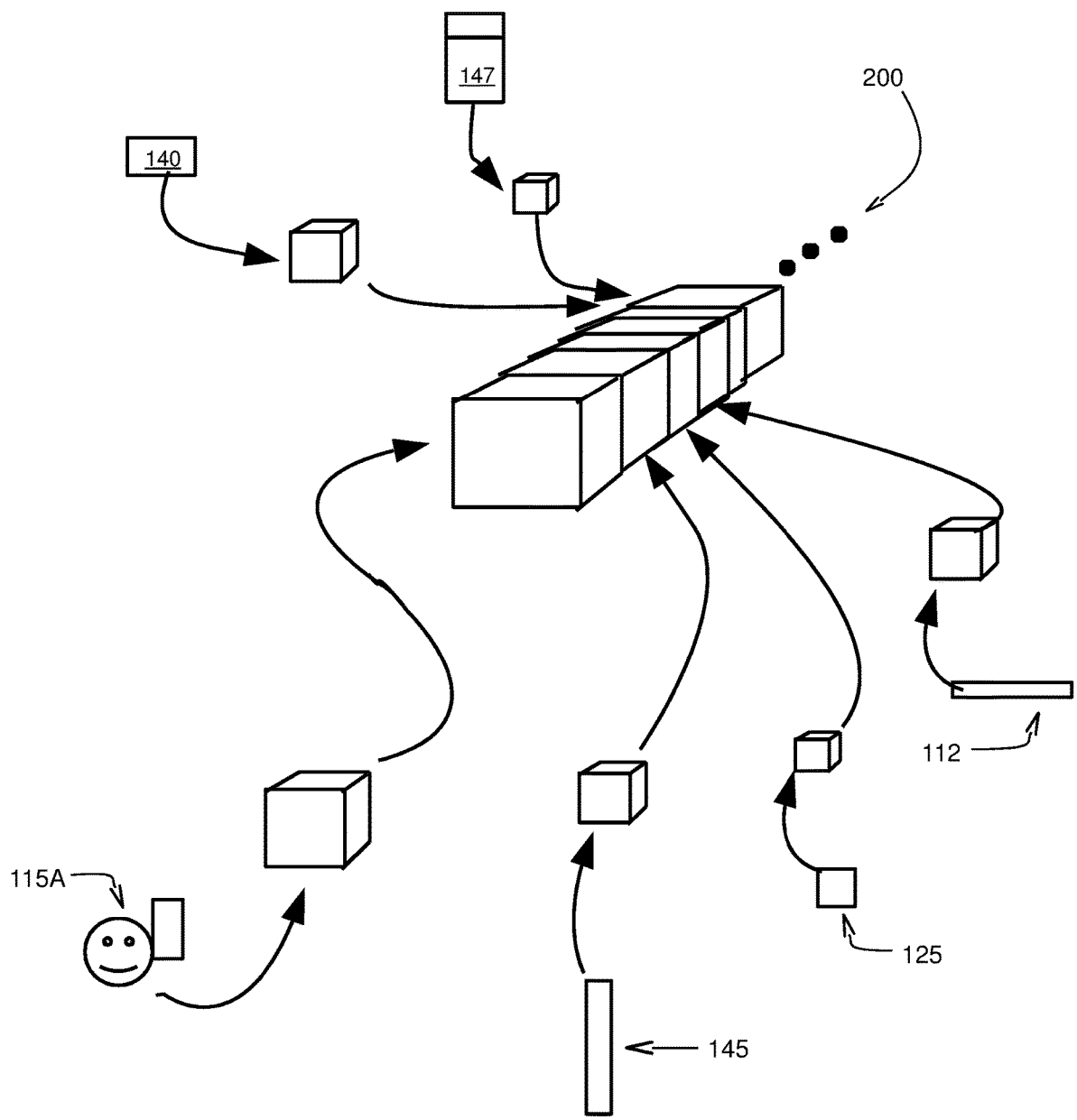
FIG. 2 is an illustration of a block chain 200 being formed of data that may be used for iTV programming guide and feature content decisions and analysis according to various embodiments.

FIG. 2 is an illustration of a block chain 200 being formed of data from a plurality of connected devices, such as smartphones, IoT devices, etc. Preferably, each block is specifically formatted for easy entry (compatible) with the larger dataset maintained, for example, in large dataset 330.

Broadly described this embodiment includes a blockchain of disparate data maintained and used for decisions regarding iTV, content, format, and features. The blockchain may be comprised of different sized blocks, different amounts of data per block, different types of data between blocks, etc. In one aspect, the invention broadly defined includes producing an iTV related data item from an interconnected device (e.g., non-entertainment device) and entering the data into a blockchain for use in interactive guide programming or features. In FIG. 2, the blockchain 200 includes data chained together from disparate devices, for example, Appliance 147, transmits data (e.g., just dispensed ice) which is converted to a block format and entered into the blockchain 200 (the figure is conceptual). Appropriate ledgers are also updated. Ledgers include, for example, a listing of each change made in the blockchain over time, and/or other copies of the blockchain. The block format may be produced by the Appliance 147, computer 140, user's smart phone 140, etc., or may be produced by a separate connected device. FIG. 2 illustrates data/chain additions by several of the devices shown in FIG. 1.

In one embodiment, the blockchain includes data that has been modified prior to being added to the blockchain. The prior modified data may be an aggregation of related data, an equation or a result from empirical, intelligent, and/or trending analysis of raw or pre-processed data from any of the data sources. The prior modified data may be, for example, data from an IoT or other devices that the owner has authorized to be used and has been modified for sanitization to meet the type of data (e.g., anonymized) the user has authorized. The prior modifications may be performed at the device, in a cloud-based application associated with the device, upon receipt by a block chain amalgamation routine (e.g., computer, enabled hub, or other device producing or adding to block chain 200), or prior to use by either Deep Learning module 315 or AI module 325, for example.

In one embodiment, the block chain contains data from a plurality of devices which may have a common theme, such as a block chain of television, radio, multi-media, and music devices. In another embodiment, the block chain contains data from a plurality of devices of varying themes, such as health related devices, transportation devices (e.g., bicycles, cars), and entertainment devices, and essentially any other type of connected device. In yet other embodiments, the blockchains may be more specific, such as a blockchain of mobile devices (data from mobile devices), a blockchain of purchases, a blockchain of website data, a blockchain of mobile app history, IoT and/or connected device histories, etc.

Other devices, including IoT and smart devices, and integrations (including smart device) may include, for example, Refrigerator open/close state, smart cup/thermos: content based on alcohol content of drink, room temperature, smart toy playtime: kids programming, and features for pausing programming based on a state of a user's door bell (e.g., pause when doorbell rings, or pause when it is apparent doorbell is going to ring (e.g., via video recognition of someone reaching for the doorbell), and pausing when someone approaches the door, for example.

In one embodiment, the EPG may display messages related to smart devices and/or IoT devices relative to a current state of the IoT device (e.g., Hello user,—you left the refrigerator door open . . . , or the kitchen timer expires in 2 minutes . . . , etc.). Such communications may be forwarded from a cloud server to the EPG for display, and the cloud server, may, for example, monitor the users data directly from connected devices or by retrieving data from the user's block chain of data that may include some or all the user's IoT and other data. Permissions to use or review the data in block chain (or other formats) is controlled by the user and the data may be stored securely in the cloud along with the permissions.

In one embodiment, a block chain or other data storage locker is provided wherein all of the user's data is maintain and controls access to various other programs, websites, retailers, etc., such data being strictly controlled according to preferences of the user, and utilized for the advantage of the user over corporate interests. In various embodiments, the storage locker provides the data and insight to make program content recommendations. In one embodiment, anonymous and/or various devices owned by a user register (e.g., with a block chain mechanism associated with the secure locker) and begin adding onto a continuous block chain of user preferences stored securely in the cloud and controlled by the individual user.

While the block chain is one way of gathering, transporting, and storing data for use in the various embodiments of the invention, including populating large dataset 330, other methods of collecting data for analysis or decisions may include pinging a server (databanks), cross-referencing with other company databases, and open APIs. Anonymizing IDs and cross-referencing other databases whether centralized or de-centralized. Collecting data from whatever sources are available or allowed.

Several embodiments and various aspects of the present invention preferably utilize or are enhanced by access to what is or may be considered private information or data, such as email information, text messages, purchase histories, search terms/results, location data, IoT, and other data from various devices. Authorization is preferably obtained via a multi-level authorization with opt-in consent that captures privacy-by-design, such as designs consistent with current EU guidelines. The multi-level design may include specific opt-in for each type of data (e.g., text messaging, location data, and IoT data are just three examples of data types), and for each use of the data. Generally speaking, many aspects of the present invention would include permission for data use in determining appropriate or preferred content offerings to the user. Permission may also be obtained in a similar manner to gather and save data to enhance the dataset upon which rules are determined for other users.

The present invention includes maintaining a blockchain of permissions (e.g., permissions granted via multi-level opt-in privacy-by-design) that are accessible by or provided to $3^{rd}$ parties (such as through an API) to authorize the release of data. The present invention also includes use of blockchain of permissions to provide permission to release data through an API or other portal. The block chain may be, for example, identified by an ID or pointer provided to an API which then releases data consistent with the granted permissions in the blockchain for that user.

It is envisioned that preferred content offerings, although accessing the user's data is a service to the user and which the user may be charged fees, which is appropriate because the result is better and ends up saving the user time in finding content the user wants to watch. Furthermore, even with permission to access data, purveyors of an EPG incorporating one or more embodiment or aspect of the invention will likely not be able to obtain the data for free and user charges will help offset that cost. Accordingly, the present invention includes buying data with the users' permission, the data for use in determining appropriate/relevant content to offer the user.

The present invention includes a multi-level disclosure for the use of user data, terms of service, and privacy policies from connected devices, computers, applications, etc., where the data is used and analyzed to suggest or provide content selections, content layout, and features of an interactive television guide (or similar entertainment guides e.g., cable guide, streaming guide, YouTube guide, etc.).

Privacy protection is viewed as important to get wide user acceptance and thereby make the most from available data. The level of protection may also vary depending on current circumstances, especially in group settings. The present invention includes protection of private information in group settings, and in the various embodiments of the invention where group dynamics play a role in the selection of content, in at least one embodiment of the invention a lowest common denominator of privacy settings is maintained across the group. The present invention also includes dynamic changes in privacy settings that would allow less restrictiveness in the case of family or friends groups, which could, for example, be maintained in a settings menu (e.g., dispense restrictions while in family group).

The present invention includes comparing blockchain of data intended for use in iTV programming/guide content and/or features to a ledger to authenticate or otherwise support the chain or any portion thereof. The blockchain may be utilized, for example, to verify viewer attributes and attention prior to advertising content and again to show advertisers the impact/reach of their advertising programs (e.g., advertising displayed along with or in conjunction with content/indicia of content in an iTV programming guide). The blockchain is, for example, used to verify/validate the revenues to be paid for advertising.

The blockchain may be, for example, linked, connected, referenced by one or more other block chains. For example, a block chain maintained for user interaction with the physical world may be linked to separate block chains for advertising and ratings/rankings of shows which themselves may be linked together and to yet other block chains for various purposes (e.g., linked to a blockchain not specifically related to iTV, content, programming guides, or features thereof).

Figure 3:
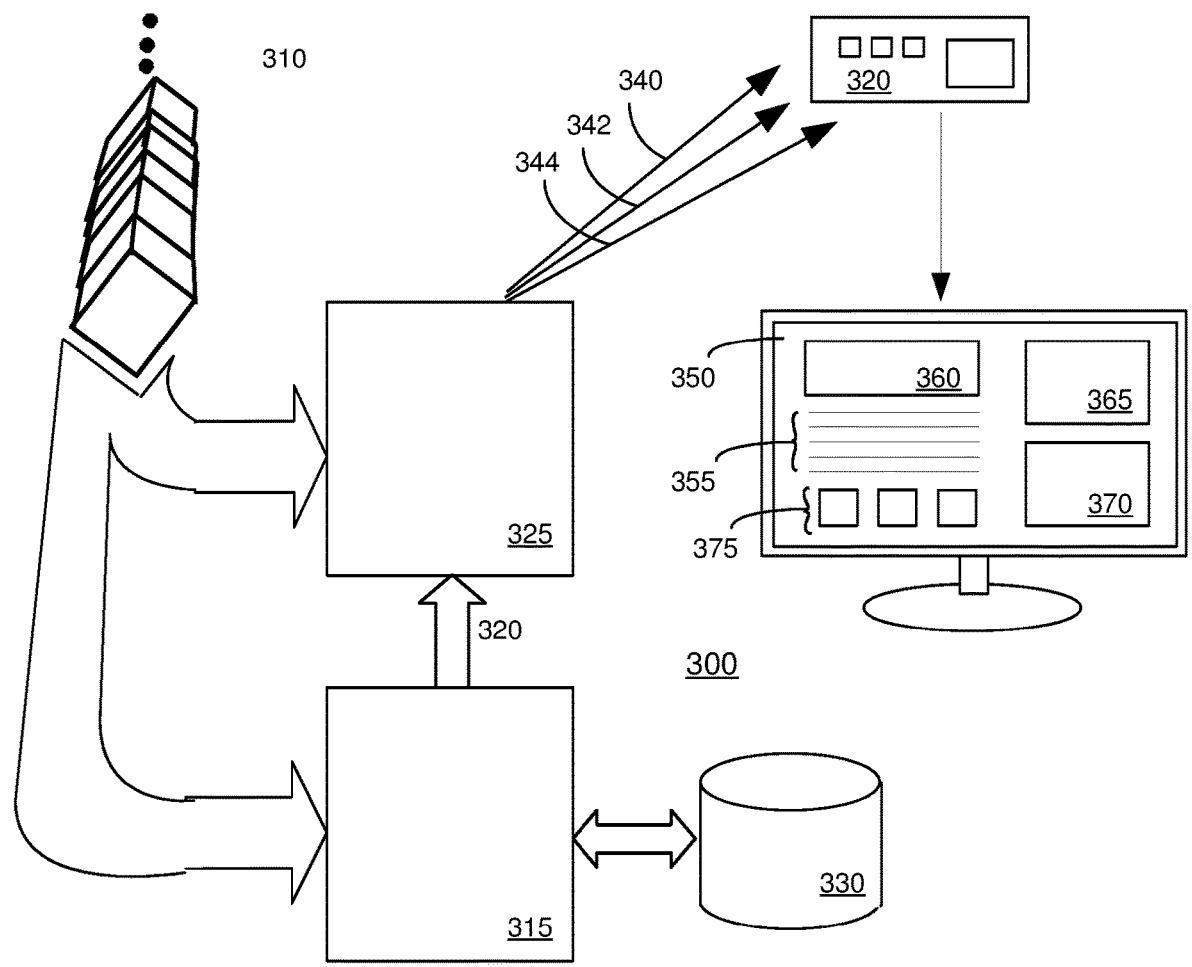
FIG. 3 is a diagram of a deep learning/AI processing paradigm for content, format, and feature selection according to various embodiments.

The present invention includes receiving multiple user centric blockchains and feeding those chains and/or other data into an AI interface using rules that are validated via machine learning over a large set of the user's or users' data and/or yet other user's data. FIG. 3 is a diagram of an AI/deep learning architecture 300 according to an exemplary embodiment of the present invention. A blockchain (or other data) 310 is input to a deep learning module 315 which evaluates the data (e.g., blockchain 310) relative to user-centric, peer-centric, general population centric, trending centric, and other data sets. The deep learning module 315 also stores data into database 330 for use in machine and deep learning routines, and may also support directed learning for use in, for example, promotional content (promotion of new shows/movies) and or goods/services sold on, along with, or suggested by various links, icons, advertisements, programs themselves, banners, etc. on an EPG.

The various groups may be specific categories or types of persons or features or recent actions shared in common. In one embodiment, each evaluation is weighted based on a relevancy score as to previous analyses and a relevancy score indicating how those previous analyses worked out. The deep learning environment is set up to parse the dataset in many different ways and re-run analyses with all relevant combinations of data and determine the datasets and analyses that produce the best results. In one embodiment, the invention is the use of a dataset and relationships relevant to the selection of content, format, or features in an interactive television guide, evaluating that dataset, selecting a different set of data and/or relationships and reevaluating, and repeating until all or nearly all combinations have been evaluated. The present invention includes forming rules based on the data and relationships having the best results. The best results may be, for example, most likely to watch a content selection, most likely to click on an ad, most likely to purchase an advertised item (whether through an ad on the interactive guide or separately).

Rules 320 (or other data/information), based on the best results (at least relevant results) form the basis for AI decision making and are passed to AI module 325 where the block chain (and other block chains if necessary) or data is also transmitted. A verification module (not shown) compares a ledger associated with the blockchain to ensure that the individual characteristics/data contained in the blockchain are valid.

The most recent data from all relevant sources and preferably weighted more heavily due to recency is compared/analyzed/triggers rules in the AI module to determine most appropriate content. Such analysis includes, for example, current viewership, how the viewership is changing (if it is changing), and weighting based on preferences and other factors. Ultimately, selectable content 340, formatting (e.g., application layout file) 342, and features 344 are sent individually or combined to a set-top box 320. From the information sent, an EPG 350 is displayed which includes, for example, a list of program content selections 355. In one embodiment, a first line choice of the program content selections is played in a wide-screen format box 360 at the top of the list. A programable/changeable set of secondary selections 375 may be shown at the bottom of the list. Side bars 365 and 370 may contain previews of promoted content (e.g., click on a side bar and a pay-per-view window appears), advertising, general links, news, stock market reports, gaming updates (e.g., reminding a user about a paused game or status of an ongoing game, sports book, etc.).

The inventors have realized the dynamics of groups and other factors effecting program content selection and choices. Updates may be sent to the set-top box when, for example, the viewership changes (e.g., when user 115C enters the room). The changes can be made dynamically in real-time and may include, for example, highlighting so that all viewers of the guide easily see the new information.

The present invention includes changing rules, selected content, layout, or features of a programming guide based on a changing composition of viewers near the display. For example, when a new user enters the room where the display is in use the results, format, and/or features of the program guide change accordingly (the new user is accorded some weight in the content selection displayed). Such additional viewers are identified by, for example, any of proximity to the display, via image recognition, SSID, mobile device location data (e.g., through an app), smartphone GPS data, Wi-Fi signals, etc. Blockchain data may also be used to identify users (e.g. recently entered blockchain data relating to a user's movement or recent activities). Although large scale changes may be appropriate, in typical cases merely tweaking the content or smaller decision changes are likely appropriate and mainly dependent on the mix or confluence of viewers at the time of the change (a same mix of viewers at a different time would most likely result in different changes). In one example, when a user enters or passes through a room where an interactive guide is in use, a highlighted pop-up may appear including content relevant to the entering users interests, recent activities, or other criteria, all of which may be determined from, for example, AI rules vetted in a deep learning environment using the user's data.

The additional viewers (or change in the mix of viewers) may be identified by, for example, any of proximity to the display, via image or facial recognition, SSID, GPS signals, mobile device location data (e.g., through an app—e.g., opening an app associated with the set-top box, OTT service, or apps unrelated to the provider, OTT, display, or set-top box from which data is available, etc.), etc. A change in the mix of users or confluence of a current group of users in the room may trigger a new item of more likely relevance to the current group mix and may, for example, be displayed in a highlighted pop-up format.

Accordingly, the invention includes an Electronic Program Guide (EPG) enabled by, for example, a set-top or OTT box/service onto a large screen display where the EPG contains and/or references content selected based on a proximity of users to the large screen display. Data used to make the content decisions may be weighted more heavily toward one user versus others (e.g., set owner, resident, guest, age, may all be accorded different weights). In one embodiment, users closer to the display have greater weight in content selection and/or arrangement in the EPG. The relationship of users may also be taken into account (e.g., friends given greater weight, such that, for example, a user's friend is more likely to have a good experience when visiting the user). The present invention includes a setting menu that allows a user to specify an order of preferences for weighting, such as, for example extending priority to guests or new users. In one embodiment users with a more recent experience such as a long run, attending a festival, etc., may be given higher priority. Users with a shared experience would both synergistically and from a confluence perspective gain greater weighting especially for content related to the shared experience.

The EPG is suited for changing content (and/or format), and particularly for making changes dynamically based on users/viewers currently in the room. Such dynamicity may be provided by different types of data sources and different AI rules. For example, every user has different data compared to other users and may also have a different set of AI rules being applied and different decisions being made for the selection or arrangement of content to be presented in the EPG.

However, the invention includes evaluating the confluence of different people in the household and particularly those in the viewing room to find content and experiences related or of interest to the group as a whole. The selection of content to be displayed or offered on the EPG then represents that confluence of different people, each who have an individual profile, dataset, and rules. While the EPG may be set-up for one person who is watching, the present invention provides for modifying rules as influenced by the group. Weightings of influence of the various group members can be provided by a number of factors, including social media activity (for example, high activity or connections to other members of the group may carry more weight). If a member of the group is actively engaged in a game or separately watching a video on his/her personal device, that group member may be weighted less heavily for their overall data/rules influence on the group, but the content being watched might be weighted more heavily, particularly if image recognition indicates more than one other user peering onto the same personal device.

In one embodiment, if the entire group (or a predetermined percentage of users) is peering onto the same personal device, then the EPG may automatically retrieve the selection playing on the personal device and put it on the large screen (e.g., auto chromecast). If the display is currently off, it may automatically be turned on and then the content sent to the screen. In one embodiment, risk that the content may not be intended to be shared could be mitigated with a one-click button share with group OK (e.g., "It looks like everyone here is interested, OK to chromecast?"), and the content is then cast to the large screen and/or forwarded to each individual user's personal devices.

The present invention includes auto selection of content in cases where interest in the content is certain or nearly certain to be high for the individual or group in the room at that time. The above example being one instance where immediately collected data, namely the content being viewed and the fact that all the viewers are watching it on a singular personal device. Another example may be when the group shares a common interest in specific activities, social media footprint, etc., and the content is an event (Tour De France coverage for a group of bicyclers, premier of "Ready Player One" for a group of gamers, etc. A calendar entry, especially if duplicative amongst at least a plurality of the group (or a group invitation) would also be a strong indication that auto-turn on and auto-display content is appropriate. Other examples of group content selection may be more subtle and culminated from examining data from each of the users or finding common threads among a majority or significant subset of the users, ultimately leading to the identification of content or watching a show that everybody in the group is going to be engaged in.

Group analysis may be achieved by mixing histories (purchase, website etc.), and history as a group, to provide essentially a union of data (and weightings) to select content offerings on the EPG—the data together representing the confluence of users in the group. For example, an AI analysis of the group may indicate knowledge that mom recently bought tickets, dad visited travel agency, and son just looked up best ramen in NY, . . . the analysis concluding that the group (here a family and maybe a guest, for example) knows, or at least fairly reasonably speculates, that the family or entire group are going to spend a weekend in New York City—the combined data allowing for more powerful and accurate decisions. Further, past data such as typical travel patterns amongst the group are available to enhance or bolster such decisions.

When such strong or well vetted rules are fired, programming content or shows may be presented with a stronger likelihood that the entire group will be interested. With a stronger certainty, and, for example, a determination that there is a vested interest in the content, then an automatic selection may also trigger, and almost certainly the content displayed will be more interesting (Tour of the Hudson River, Gangs of NY, Wall Street, etc., all could be some of the EPG presented choices in this example). If one selection is strong enough for auto-chromecast, it could also be strong enough to warrant turning on the display if not already on.

Accordingly, the invention includes an EPG that references content selected based upon multiple users in close proximity to a large screen display and/or set-top box. The set-top box may, for example, display the EPG on the large screen and the content contained or referenced therein comprising selections based on the multiple users. The selected content may be contained in one overall EPG display and transmitted to each of the users' mobile devices. Alternatively, the selected content could be presented in a split screen format or stacked on the large screen, along with optional individual screens sent to users' mobile devices.

In one embodiment, emotion tracking data such as that provided by a connected watch, bracelet, or other device with biometric reading capability and backend support/processing that track vital statistics and makes a decision on mood or emotion relevant to the selection, arrangement or other issues related to content. Such tracking may include eye scanning for pupil dilation used to interpret emotional state (and which may, for example, when indicating a user is agitated or upset, trigger a recommendation for a calming nature show. Such scanning may be performed by smart glasses with scanning capability or a scan from a remote camera (e.g., IoT camera), for example. A wearable such as a mood ring including sensors to directly measure mood characteristics (skin temperature, tension, perspiration, etc.) which may be individually recorded or conglomerated into a mood rating and then transmitted to a processing device, block chain, etc., and the individual data elements from the same devices may themselves be directly transmitted individually or as a group to a processing device or entered into a blockchain, for example.

A separate database or block chain may be established/enabled and updated for emotional data content relative to a user (may also be added to existing block chains or databases). Data from biometric sensors, image data from cameras, bio-rhythm application data (such as cycles), and voice data can all be utilized to establish and track emotions of the user. For example, Alexa in listening mode can determine variances in a user's voice (pitch, timbre, volume, etc.). Input from the user can help establish and/or verify mood.

Since the user's physical state is closely linked to emotional state, additional data in the block chain may include sports/workout equipment, medical devices, current/trending news (good economy, bad economy, war, elections, etc.), food related items (refrigerator door openings, food tracking applications/devices, etc.), shopping data. Further, similar data may be tracked for other individuals in the same household and the interrelations of the individual's emotional states can be used to help establish the current emotion of any of the users. Data such as checking a bio-rhythm application (e.g., such as an ovulation or fertility application) is data that potentially reflects the emotional state of a user (the bio-rhythm application presumably containing even more data). All such data makes a highly relevant set of training data that can be used specifically for determining rules the individual selections and to determine overall selections across a broader population in which at least some of this data is collected and used to make content related decisions.

Image data including facial recognition and identification of facial features (facial feature recognition) or other traits that are identifiable or associated with certain emotional states. The present invention includes determining different moods and collecting data on facial features, body posture, walking gait, etc. and associating that data with each of determined moods. The present invention includes identifying user preferences for each of the potential moods and using the data and preferences in making decisions for the selection and presentation of content. For example, if user in a certain mood tends to select items at the bottom of an EPG, then promoted materials identified to be of interest to the user are displayed at the bottom of the EPG when the user is in that mood. In another example, if a user in a certain mood tends to select Hallmark channel style movies, then when it is time to re-up their cable subscription, the system may wait until the user exhibits the identifiers associated with that mood and then presents a message to re-up their contract, and, at the same time, remind the user about the wonderful Hallmark channel (or similar channels/programming) in their subscription. In yet another example, a certain mood of a user becomes associated with a type of programming such as one mood could be associated with (or more likely to select) action movies and another mood might be associated more closely with light humor, each mood influencing top choices or layout of choices on the EPG.

The various embodiments include promoting content or selections of content in concurrence with a user's emotional state. When applied to advertising such conditions may be billed to advertisers at premium rates. A blockchain may be developed to maintain user actions and evaluate the effectiveness of mood triggered promotions of content and others. The blockchain may also be constructed to provide accounting and proof to advertisers that the desired advertising conditions were present when an ad is run, and a similar schema may be utilized in the case of Internet advertising or along with content based advertising. The present invention includes a blockchain verification of advertising revenues for conditional advertising, and particularly for advertising based on mood or emotional state of the user. Such a blockchain may be implemented by a third party having access to a provider's data (e.g., cable provider, web site operator, etc.) and provided to advertisers as billing and/or verification (verification that advertising was placed and may include time, location, user and/or user type, and verification that.

The present invention includes changing the content or presentation of content in real time if the user's mood changes. For example, while watching a program, a user's mood may change and the content selections presented may change reflecting the mood change. The present invention includes allowing the user to cycle through different selections of content based on moods the user may or may not be in. Such an embodiment may include, for example, telling the EPG (e.g., via voice interaction) that, for example, "I'm in a happy mood" and the selections may automatically change. Alternatively, a biometric mood device may send data associated with the mood to either a blockchain or a set-top box (or backend) where programming selections can be changed accordingly. In one embodiment, the selections may be changed based on an assumed mood change, such as after watching certain types of shows, certain mood changes are likely (e.g., being depressed after watching a dark movie without a desirable ending, being happy after watching Disney's original Mary Poppins, etc.).

The invention provides a basis for an emotional prediction that is useful for content choice selections provided on an EPG or other content suggestion or selection mechanism. In one embodiment, biometric data from sensors, image data, voice data, and contemporaneous program viewing together are used to select content or fire rules in an AI system to determine content selections and/or arrangement on an EPG. The rules may be vetted over the large data set (training data set) along with current emotional states associated with past programming choices over a general population and specifically the user's previously acquired data. Data regarding current mood and current choices may similarly be collected and used as training data to develop or refine rules.

Figure 4:
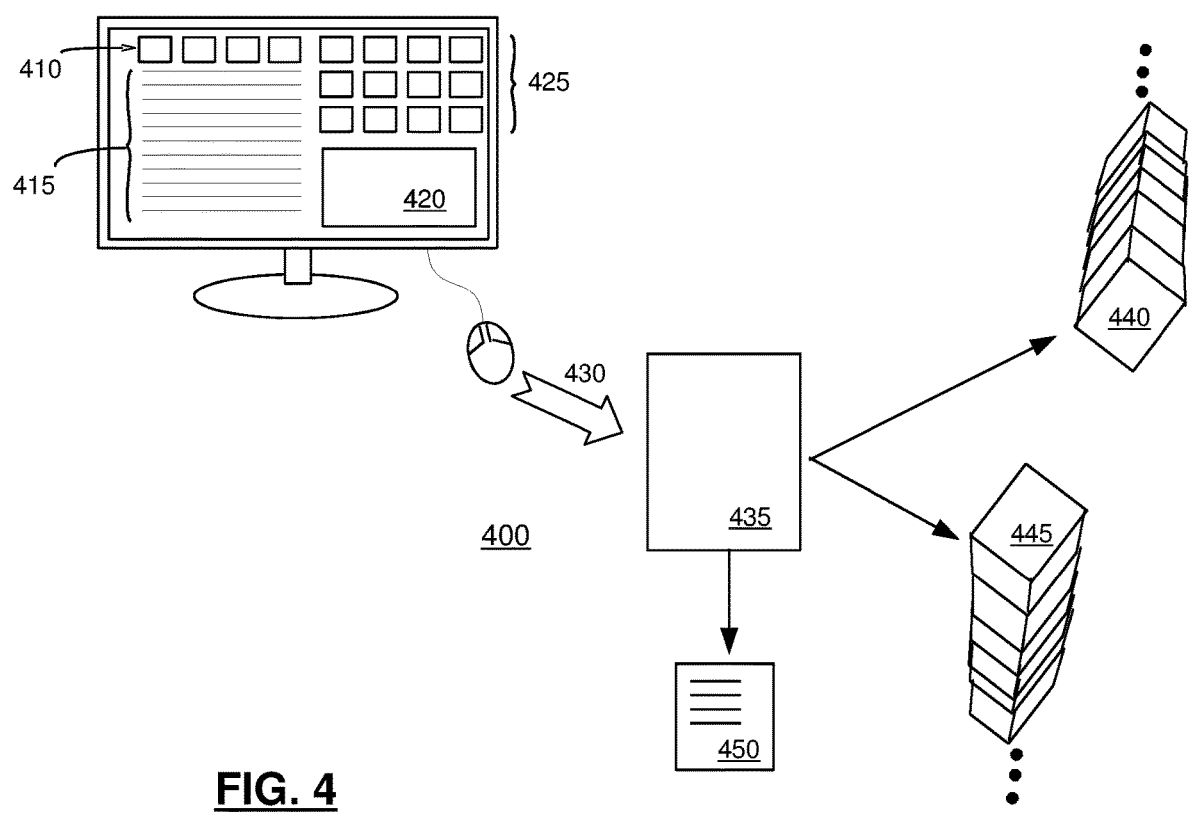
FIG. 4 is an illustration of data collection for user selection from an EPG and blockchain builder according to embodiments.

FIG. 4 is an illustration of data collection for user selection from an EPG and the building of a blockchain that can be used to evaluate the effectiveness of programming content selection, advertising revenue verification, ratings generation/verification, and general statistics regarding EPG use. A display 410 includes an EPG that invokes various user selections 430 which are sent to a database and/or blockchain. Blocks, data structures and database interfaces of applicable are performed by, for example, a block constructor 435. A single comprehensive blockchain may be utilized or separate blockchains for different sets of data. For example, a blockchain 440 for content related selections/activity and viewing time, and a separate blockchain 445 for accounting royalty (e.g., advertising clicks, purchases) which may be linked to the content based blockchain. User actions, transactions, programming selections etc. may be entered into either blockchain, or a single block chain and the information made available to all authorized parties, such as content providers to verify effectiveness of content selections, format, etc., and copyright holders for royalty verification. Each transaction into the blockchain(s) may include an update of an associated ledger 450. The present invention includes the inclusion of blockchain into the user selection and accounting process for the provision of entertainment content to users. The present invention includes changing the composition of the rules or selected content, layout, or features of the programming guide based on blockchain data from many devices including EPG's and unrelated devices.

The present invention includes an EPG where the content and/or content referenced by the EPG changes in real-time with changing composition of users in close proximity to the display. Other dynamic and/or real-time changes in EPG content/display may be invoked by new data received about a user, for example, a Google search on "Kentucky Derby" by one user on their smartphone in close proximity to the display may result in more horse related content (or racing, or animal achievement shoes, for example) selections being made available on the EPG or advertisements including horse or animal themes.

The EPG may be, for example, initially determined based on a first set of factors that are relatively stable, age group, hobbies, etc., and a second set of factors that typical change more frequently, such as recent activities, current weather, etc. In one embodiment, each factor includes a weighting as to the frequency of change, and, for example, a rare activity or event may be accorded more weight than other activities and thereby be more likely to recommend content related to the rare activity.

The present invention includes dynamically changing the EPG when a new user comes in close proximity to the display and also the group composition. For example, a particular group such as a family may consistently look for family programming content which may be automatically populated in the EPG when the family is together. A different type of content may be more prevalent when certain subsets of the family (e.g., kids only, adults only, teens, etc.). Accordingly, the EPG changes are based on individual data such as history of the individual users and the users' history and data as a group.

Changes to an EPG made upon a new family member may include, for example, more child programming, or adult-child/family programming when children enter the room. The level at which the EPG presents child appropriate programming may be a preference set by the user. For example, during family hours, the user may set the EPG such that no kiddie level programming is displayed (e.g., no Teletubbies or Sesame Street, but OK for "The Book Of Life" or other more adult-likeable yet kid appropriate programming), but during working hours or when no adults are present the kiddie-level programming is available.

In another embodiment, EPG preferences and recognition of individuals in the room may be linked to or programmed to change v-chip settings (e.g., via IR blaster accessing the television's menus, via a display API, or other mechanism). Such changes may include blurring out gory scenes or bleeping inappropriate language. The blurring/bleeping may be set at varying levels for amount of blur/bleep, as some may prefer that the material be completely or nearly completely eradicated, and others may prefer that things just get blurred or muted.

A menu that sets the amount of blurring or bleeping may have a sliding bar—like a volume bar, or radio buttons (e.g., buttons for low, moderate, and maximum blur/bleep). The menu may include a short example scene that provides a preview of the amount of blurring or bleeping that occurs for the level. Such a preview may play a bleeped portion of an example scene (e.g., not of any likely content selections to avoid being a spoiler) and then immediately play the same portion of a scene in its original form. The preview may be presented in endless loop format such that it in repetition allows for detailed inspection of the bleep's effectiveness. Changing the radio button or sliding the bar would increase or decrease the amount of bleep in real-time as the loop is playing until the desired amount of bleep/blur is obtained. The bleep and blur may be set-up as separate functions such that a viewer may prefer more bleep but little or no blurring, for example. In embodiments where separate audio tracks are streamed to separate viewers the bleep may be adjusted for each viewers channels, or taken out entirely if streamed to an approved individual such as an adult.

In one embodiment, the EPG is set-up to track altered scenes and bookmark or record those scenes so the missing material may be quickly reviewed if desired after the children leave the room. Quick review may be accomplished by a V-Chip review button that jumps/"rewinds" to the entire scene that included altered material or playing just the portion(s) of the scene that were altered (perhaps with a short automatically selected lead-in or sandwiched between a lead-in and trailer). In one embodiment, the quick review plays each of the altered portions of scenes staccato fashion—one right after the other (perhaps with short lead-ins just before each of the altered materials).

Thus the present invention provides for the protection of children and others by the implementation of v-chip or v-chip like capabilities on a dynamic basis. By recognizing that the child has entered the room, things like f-bombs can be bleeped and heads being bashed can be blurred by either enabling appropriate settings on the display (if it is capable) or altering the video and/or audio track before inputting it to the display. A convenient capability is provided so the content bleeped is easily reviewed.

The present invention may also be configured to select different audio tracks depending upon the composition of users in the room. Program audio feed may be personalized based on who is in the room, language. For example, if Grandma only understands Chinese the set-top box selects a Chinese track and feeds English to headsets, earpieces, hearing aids, cochlear implants, etc., of other users or vice versa. In another example, a sports program feed may be changed to an appropriate announcer that favors the user's team.

The present invention includes recognition of a user that enters the room having a hearing device with streaming capability and feeds the appropriate audio content that may be based on the hearing device user's preferences. (and may include sending signals to the hearing device to reconfigure the hearing device to be in a preferred or more optimal mode for the user to enjoy the programming.

In various embodiments, the EPG is configured to be a coordinating station. Distributing varying content based on the confluence of viewers in the room. Audio to bionic ear or headset, mobile device, for example, from set-top box to mobile, and then into bluetooth and the bionic ear (hearing device).

Returning to FIG. 4, the display 410 illustrates a layout of a potential EPG that takes advantages of several features of the invention. Content selections 415 include a list of selectable titles or references to another screen with selections in a general topic or genre. The selections 415 may include movies or other programming content based on rules, AI, machine learning, deep learning, or guided learning as to selections most appropriate for the user and or group of users. Data for the decisions may be received via block chain of user actions, data from IoT and IoT-like devices, viewing history, etc. A preview row of windows 412 can include several functions including previews of the top selections, or selections most relevant to recent user activities. The preview row of windows may also be populated with the most recent selections, or programming most related to the most recent selections, and selected by clicking the desired window.

A block of windows 425 (as illustrated in 4 columns) may provide selection relevant to the user and other users near the display. In one embodiment, each column or row of the block of windows 425 may be dedicated to most likely choices of nearby viewers/users. For example, user 115A may have all top ranked potential selections in column 1, and user 115B may have his/her top ranked potential selection in column 2, and so on.

Window 420 may be reserved to promoted content. In one embodiment, the content is promoted pay-per-view, which may be most relevant to the user's background and recent activities/data. In one embodiment, the number of rows and columns (or size of windows/thumbnails) is variable. When more relevant material is available (e.g., a user who has a lot of interests and recent activities may have more content "matches," or more users viewing), additional rows or columns may be allocated in, for example, the application layout file.

Individual users may also receive customized programming guides. For example, an EPG similar to that on display 410 may be displayed on display 110 by set-top box 120. The main programming selections may be most relevant to user 115A, but also contain component relevant to user 115B and user 115B may also be sent a programming guide (e.g., to his/her smartphone) that is customized more toward user 115B. In the event user 115C enters the room (close proximity to display 110), the selections may be re-arranged or change as appropriate according to the rules, data, and settings. The customized guides may also be updated based on varying composition of viewers near the display and/or detected activities of one or more users near the display.

Although the present invention makes great strides toward finding and presenting relevant content for the viewers currently at hand, the inventors have recognized that relying entirely on relevant content selected based on current and past activities may not be the best solution and the present invention includes adding a random factor or other methods of determining content to be displayed (within parameters of course, including taking into account v-chip like settings). The present invention includes having different levels of weight accorded for different scopes of randomness or variability in content selection. Such randomness or variability may include, for example, higher weighting for randomly selected programming within a known area of interest within the group or of the group as a whole, randomness within trending content, and randomness amongst highly rated content. However, it is envisioned that randomness/variability of the content would typically encompass a smaller overall portion of the content selections. Fully random selections being the most limited as randomness may be interjected into content selection where the groups within which randomness is applied may be fully vetted by rules and all available user data as shown appropriate by the rules or AI modules.

The inventors have recognized that the large amount of content available, especially for users with a wide variety of interests, can make it difficult to present users with the best available content selections. In one embodiment, windows 412 are genre buttons. Once the user selects a genre button, the AI rules, considering the blockchain data are fired again for each user and as a group to provide new selections within the selected genre.

The present invention includes data recognized from images and/or sound provided by security cameras, nest-like doorbells, Kinect, gaming, DVDs, cloud storage (including images, music, videos, and data), and other devices. Such data may be used independently, passed directly to the set-top box or sent to a remote processing device. Such data may be included in a block chain and distributed to various computing devices or the set-top box. Such data may be utilized to build a profile of each user or validate user models/profiles. Ultimately, such data, especially more recently retrieved data, drives decisions as to the content, format, and features of the programming guide.

The present invention includes a personalization of advertising relative to activities one or more users are engaged in at any given time. For example, advertising soda when a user answers the door (or just as or even before the doorbell rings) when pizza is delivered. For example, nest-like doorbell data (e.g., from doorbell 125) can be utilized to determine the pizza delivery person is coming to the house before the doorbell is rung, and with that information, the coke advertisement can be placed just prior to the pizza's arrival. Pizza delivery emails/texts (which may also contain location data, ETAs, etc.) may also be intercepted and used similarly). The present invention includes deriving location data from one or more sources for one or more events and using the location data for timing of presentation of advertising to EPG uses.

Data may be retrieved, for example, from apps themselves, associated servers, or from a mobile device that monitors the use of various applications through its operating system (or another app) that retrieves OS information and reports it to, for example, large dataset 330, deep learning module 315, or any of the associated blockchains from which data for analysis, training, or decisions are made. The OS data may be minimally invasive such as a count of the number of times an app is opened, timing when an app is opened, and amount of data fed through the app, a relative percentage increase or decrease in use of the app, but could be more invasive depending of permissions set by the user. The present invention includes a blockchain of OS data retrieved from an operating system (e.g., data from iOS actions). The OS data may be packaged, tabulated, enhanced, weighted, or pre-processed to, for example, facilitate its integration into any of data storage, analysis, deep/machine learning, use as decision triggers or firing of validated rules, etc.

The present invention also includes the production of rules and the establishment of data and relationships for use in rules based decision making, machine learning, deep learning, guided learning, and other forms of artificial intelligence as applied in interactive television, television or programming guides, selections of content, and features of interest related to programming, content, layout, advertising, etc. Such data may include data derived from a soundtrack of past and currently viewed programming, data from non-entertainment devices, data from mobile devices, data from IoT devices, social media, and others. The relationships may include, for example, a relationship between data derived from non-entertainment related equipment and an entertainment center including any of a set-top box, television, mobile devices, mobile device interfaces including remote control applications on a smartphone.

Ultimately, a series of content, priorities, format, and features are selected and displayed to a user on an interactive programming guide. In the event separate devices are present, the individual users may be sent customized individual programming guides to their smart phones, for example. The present invention includes using blockchains associated with different users to provide simultaneous customized interactive programming guides to the different users. Although blockchain has many advantages including necessary security and access to needed data, it should be understood that the various embodiments and uses of blockchain may instead use data structures constructed to contain, transmit, and store the relevant data. The customized programming guides may include different content, different formats, and different features including advertising. The customized programming guides may be sent from a set-top box to the users' smartphones or may be transmitted over data or cellular networks such as 5G.

Accordingly, the present invention provides intelligent selection/prediction of desired content and includes setting up different delivery channels for the guides. The guides are configured to allow user interaction and selection of content on another display (e.g., large screen in this example). Conflicts may be resolved via priorities, voting among the current users in a predetermined proximity of the main display, messaging/negotiation between the users facilitated by their smart phones, remote controls, etc. Features presented may be changed during the selection process. Individual users may be provided the option of viewing their preferred selection on their smart phone while the group (or priority) selection is played on the large screen.

The present invention may be embodied as an electronic Program Guide (EPG) enabled by a set-top or OTT box onto a large screen display, wherein the EPG contains and/or references content selected based on a proximity of users to the large screen display. The proximity of users is estimated based on smartphone GPS data or WiFi signals, for example. In one embodiment, users closer to the display have greater weight in content selection and/or arrangement in the EPG. The content and/or content reference by the EPG may be configured to change with changing composition of users in close proximity to the display. The change(s) may be based on individual data and history of the individual users and as a group.

The present invention may be embodied in an Electronic Programming Guide (EPG) device comprising a block chain module configured to receive blockchains of user data, the module further configured to determine likely content choices based on the blockchain and display the content choices on an Electronic Programming Guide for selection by the user. Selections by the user may be entered into a blockchain used for royalty payment calculations and verification which may be added into the blockchain as a recent activity. The blockchain includes, for example, data from IoT devices unrelated to entertainment.

The present invention may be embodied in a method comprising steps including transmitting, by a computing device, content to one or more user devices; retrieving, by the computing device from one or more sources, an application layout file associated with a feature related to the content; customizing, by the computing device, the application layout file to generate one or more customized application layout files each configured for a respective device platform and user of the device, wherein each of the one or more customized application layout files comprising a structure that indicates attributes of display layout data for rendering the feature related to the content for the respective device platform and user; and transmitting, by the computing device, the one or more customized application layout files to a plurality of user devices each implementing one of the plurality of device platforms to allow each of the plurality of user devices to output related to the content. The content is, for example, selected via an Artificial Intelligence (AI) program.

The content of the program guide (e.g. program descriptions) are, for example, modified in a guided learning environment intended to produce program guide content that appeals to at least one user. The guided learning environment may, for example, produce rules for production of program guide content validated over a large dataset. Content for the respective device platform and user may be selected using data about the user and/or activities of the user contained in blockchain. The blockchain may comprise data from at least one IoT device.

The content of the program guide (e.g., program descriptions and/or content proposed by the program guide) may be determined based on user data authorized by the user via a privacy statement comprising a multi-level privacy-by-design with an opt-in format. Further, the AI program may be configured to target the user of the device to enhance the layout ultimately presented for the user's benefit. The structure's attributes comprise a general location and allows the receiving device to effect actual placement. At least one attribute may, for example, be generated on an AI based platform, or via rules validated and/or refined via machine learning over a large dataset. The large dataset may comprise the user's data and/or other users and/or non-user's data. In one embodiment, the rules are validated over a multi-level data set as in, for example, a multi-level dataset comprising levels of lateral and vertical relationships to the user. The levels may comprise any of data from a plurality of all users, users of similar interests/backgrounds (or other likenesses, e.g., users sharing similar hobby or interest—users sharing more than one similar hobby or interest), similar Internet/Social Media searches, likes/dislikes, friends, friends of similar backgrounds, friends sharing similar interests, and fiends of similar backgrounds, interests, on-line/social profiles.

The step of transmitting may comprise transmitting over different networks to different user devices. In one variation that includes one or more special cases individually or together, beginning with where a user device may be transmitted to via a mobile phone network not used by (or not necessarily used by) the other networks to receive the content, another device may be transmitted to via a mobile data network not used by (or not necessarily used by) the other devices to receive the content, yet another device may be transmitted to via a Wi-Fi network not utilized by (or not necessarily used by) the other devices to receive the content, yet still another device may be transmitted to via a cable television-like network not utilized by (or not necessarily used by) the other devices to receive the content but may be (or intended to be utilized) by the other user's to view the content on a larger screen than the other devices.

The files may be constructed and/or arranged based on AI derived data. Alternatively, the files may be constructed and/or arranged based on data derived in machine learning environment. In another alternative, the files are constructed and/or arranged based on rules verified over a large dataset of the same and other user selections and performance correlated to the user.

The customized application layout file may be customized for different mobile devices and transmitted over separate mobile connections to each device. The customized application layout file may be customized for different devices connected to a same network as a primary device which facilitates transmission of an application layout file to another device (e.g., a local network in proximity of both devices and mobile wide area networks such as mobile phone and data networks). The customized application layout file may be customized for different devices in close proximity. The customized application layout file may be customized for different users and each users' devices in close proximity. The customized application layout file may be customized for a particular user's device and content populating an interactive programming guide on the user's device is customized for that user.

Content populating that user's interactive programming guide for a particular show or event may be different from content populating another user's device or the display. Differences in content between user devices may comprise adjustments or layout derived from a deep learning or machine learning environment. The machine learning environment may comprise a guided learning environment configured to make a selection or selections more attractive to the particular user.

Any of the methods or processes of the invention may be embodied or comprise a computer readable media and a set of instructions stored by the computer readable media that, when loaded into a computer, cause the computer to perform the steps of the method(s) or process(es). Methods may be embodied in a set of computer instructions stored on a computer readable media that when loaded into a computer, cause the computer to perform the steps of said method. The computer instructions may be compiled and stored as an executable program on computer readable media. The computer readable instructions, including layout files and other information of the invention may be stored in an electronic signal and transmitted from device to device, across a network, or broadcast.

The present invention may be embodied as an interactive programming guide configured to display indicia of content and provide selection mechanisms for a user to select content for display, wherein the content for display is selected from plurality of licensed and/or original content prioritized via a schema comprising data about a user authorized for use by the user. User authorization may comprise one or more opt-in selections in a privacy policy comprising a privacy-by-design multi-level opt-ins each describing specific use of the data. The data may comprise connected devices, or information from connected devices, no necessarily related to entertainment and may be unrelated to entertainment. The data is stored in blockchain along with other data, and the blockchain data may be vetted in a deep learning environment and may ultimately be utilized to determine content most relevant to the user. The data comprises, for example, user content selections and viewing time which may be entered into a blockchain utilized to verify royalty and/or licensing payments.

In one embodiment, the present invention comprises an Electronic Programming Guide (EPG) comprising a machine learning environment configured to receive data about user activities from Internet connected devices wherein a user has approved use of the data via a privacy policy comprising a multi-level opt-in strategy explaining the use of the data in the selection of content to be presented to the user. The machine learning environment may comprise a large set of data (dataset) about the user and other users for the creation of rules specifically directed toward the user or users in general. The large dataset may comprise a blockchain comprising data collected from IoT devices such as non-entertainment related IoT devices. The large dataset may comprise data about a plurality of users and used for vetting rules for any individual or each of the individual users.

The EPG may be configured to dynamically change based on a current group of viewers (users) currently in the room (typically where the large screen display and set-top box are located, but not necessarily). Each user may be setup with their own set of rules or associations, and wherein the ultimate selection choices are presented according to weight within the group. Selections may be customized for each individual user and simultaneously sent to the individual user's mobile devices at the same time that selections for the overall group are sent to the large screen display. In one embodiment, the present invention pieces together a pattern in multiple users' data to recognize a confluence of the users that points to choices reflecting that confluence. The use of user data and decisions related thereto may become more restrictive to protect privacy in some group situations (such features may be part of settings to allow more or less restrictiveness based on composition of the group present).

Content for the EPG may be based upon multiple users in close proximity to a large screen display and/or set-top box. The set-top box may be configured to display the programming guide on the large screen and the content contained or referenced therein comprising selections based on the multiple users. The separate programming guides sent to each individual user's mobile devices (e.g., smartphones) preferably specifically target the individual users, but may be influenced by the group.

The present invention may be embodied as a system for playing back programs, the system comprising a first user equipment, coupled to a first display screen configured to display video, comprising first processing circuitry configured to receive a record request to record a program on the first user equipment; in response to receiving the record request, record the program on the first user equipment; receive a request to play back the program from a second user equipment; and in response to receiving the request to play back the program, transmit the program to the second user equipment; and the second user equipment, coupled to a second display Screen configured to display video, comprising second processing circuitry configured to transmit the request to play back the program to the first user equipment, receive the transmitted program from the first user equipment; and generate the received program for display on the second display screen.

The present invention may be embodied as a system for playing content, comprising, first user equipment comprising first processing circuitry configured to receive a request to record content; the record request initiated from a remote menu populated based on rules validated over a large dataset; the first user equipment, in response to receiving the record request, if the program is available outside the system, marking an indicia of the content as recorded and linking a reference to the content with the marked indicia on the first user equipment; receive a request to play back the program from a second user equipment; and in response to receiving the request to play back the program, transmit the program to the second user equipment. The remote menu may be populated based on blockchain data applied to the rules. The large data set may comprise blockchain. The large data set may comprise, for example, at least three of IoT data, search engine data, text message data, and location data. The remote menu may be populated based on a plurality of users in close proximity to the remote device. In essentially any embodiment or variation, the second user equipment, coupled to a second display Screen configured to display video, comprising: second processing circuitry configured to: transmit the request to play back the program to the first user equipment; receive the transmitted program from the first user equipment; and generate the received program for display on the second display screen. The marked indicia may be configured to be accessible by the remote device.

The present invention may be embodied as an interactive program guide wherein recent activities and historical data of users in close proximity to a display are utilized to determine content and format and/or features of the program guide and wherein content of the program guide describing content to be selected for viewing is modified based on knowledge of the users' activities and history. The modified program guide content may be determined based on decisions derived from a machine learning environment. The knowledge of users' activities and history may comprise data encrypted in a blockchain format. The user selections and/or content viewed by users may be maintained in blockchain. The user selections may be maintained in blockchain format and linked to royalty calculations and/or ratings verification. A blockchain may be formed to maintain accounting for royalties and/or advertising, e.g., royalties owed (for content viewed) and advertising revenue due (for any of click-throughs, viewing/pause times, etc.).

In one embodiment, the present invention provides a database of metadata derived from posted content which may include content from any of YouTube, Social Media, or other sources. The metadata may include object and/or character recognition of images in the content (e.g., pictures, or frames of a video, etc.), audio (e.g., words derived from speech recognition of audio in the content), character (e.g., words derived from character recognition in images of the content, etc.). The metadata may include location information, and the metadata may be supplemented by searching the location data or identifying known events, features, cultures, or other information about the location which may be determined separately from the image itself (e.g., Google searching the location).

The metadata may be amalgamated and/or made available for searching in AI routines configured to find patterns and/or subject matter of interest to one or more persons near an entertainment device, may suggest programming from various content providers based on viewer likes, dislikes, recent activities, demographics, etc. (e.g., suggestion provided in an EPG or a pop-up window in an EPG or during a program or other activity). Such suggestions may occur on start-up of the entertainment device or be provided in a notification on a user's mobile device. Such suggestions may include suggestions specifically targeting a confluence of all the viewers near/at/or watching the entertainment device (or near a user subscribing to a service providing suggestions). Pop-up messages on the entertainment device (e.g., during current programming) or on an EPG display may be specifically targeted to one or more members of the group (e.g., a new member who recently walked-in), and may also be a selection that has at least some verifiable interest with each group member (e.g., a program about bears at Yellowstone when a group consists of, for example, someone who has recently been on a road trip, another person with a deep interest in conservation, and another person that is trying to decide how to vote. Such information may be found, for example, by identifying the group members (e.g., facial recognition, and comparing to Facebook or other images) and scanning social media postings of each group member and their friends, such scanning may include looking for keywords, objects, places (e.g., locations, parks, sights, geographic features), etc., that match metadata for one or more suggested programming titles. Such information may be found by reviewing databases or block-chain entries of Internet appliances (e.g., IoT devices), Internet searching, viewing habits, and those of the users' relationships (e.g., maybe the user did not go to Yellowstone, but a friend recently did).

Such scanning may include, for example, facial recognition of a user's photos, user's friend's photos, and even further connections (e.g., friend's of one or more friends) (and object/text recognition within those same photos which may be applied similarly as discussed elsewhere herein)— such scanning may be utilized, for example, to determine an attractiveness rating and then recommend specific actors and actresses based on whether they look like the user or are similar to people in the users network. For example, an of attractiveness algorithm tied to EPG recommendations, via actors, actresses, activities or other data derived from posted or provided images, for example.

In addition to content selections, the same data and similar processes may be utilized on a dating site which may suggest matches based on a similar attractiveness. Such suggestions may include activities recognized from potential dating partners' photos and suggest programs or shows with actors/actresses that match the users' attractiveness profiles.

In one embodiment, a highest level of common ground (a least degree of separation) among all, a majority, or at least some of the users/viewers is identified and utilized as a base for content selection. In some cases, the common ground may be three degrees of separation, for example, a user may not have gone to Yellowstone, and none of the user's first degree friends may have made the trip, but one or more friends of the user's friends may have, thereby establishing at least at tangential relationship to the content subject matter (primary or secondary) that may be presented.

In this manner each user's contacts or histories (e.g., browsing, etc.) may be traversed searching for the common content relationship which may be found in postings/text, pictures, activities (e.g., IoT data indicating activities), and/or computer usage (Internet, software, gaming, etc.). Accordingly, in some embodiments, a confluence amongst the viewers/users may be established by searching additional degrees of friends, contacts, etc., for relationships if not evident in the user/viewers' established goals, interests, or recent activities, for example.

Further such relationships may be established through browsing history on the Internet (e.g., Google, Facebook, etc.) which may also be based on second, third, or higher degrees and may be established through known patterns of activities. For example a user that makes searches on Mustang, or Camaro, might be assumed to have a connection with other muscle cars (Tesla, other electrics, etc.) or cars in general and known factors or relationships to this category of activity or search history amongst other people (e.g., as determined by examining or comparing the activity to large datasets of activity among many people).

In one embodiment, the programming guide contains a first set of programming, primary content, (e.g., channels subscribed to with a cable or streaming package) as a base of content which may be organized in any of the standard ways or via those described herein (e.g., ordered according to a confluence of viewers, for example) and, as a user scrolls over each content entry, along with additional data, screenshot, synopsis, etc., about that particular piece of content, a secondary listing (e.g., a set of icons across the bottom, for example) appear with related secondary content. The secondary content may include for example other related content also included in the subscribed service, but also content from disparate non-subscribed services, such as, for example, YouTube content, Internet search content/results, links to other paid related content (e.g., premium content), etc.

The secondary content may be further searched and refined/organized according to the various processes described herein. For example, the secondary content may include YouTube entries comprising alternative clips from the scrolled over primary content entry. For example, a highest ranked secondary content clip may, for example, have qualities matching any of the user's recent (or past) social media posts, recent (or past) activities (e.g., as determined by Internet appliances, for example), captured on an open mike conversation, related to previous content viewed, etc. Ranking may be further refined by matching words, script (e.g., via audio-to-text) or calculating a correspondence between them and the user's known likes, dislikes etc. Such rankings may be further refined by searching or amalgamating words in comments or reviews of such content (e.g., placing them in the database or block-chain structure) and finding those correspondences and thereby increasing or decreasing rank (or likelihood of the content being presented altogether), for example.

The secondary content may be further refined by the user's previous secondary content viewing habits. For example, a related content that has populated the secondary content listings but not selected in a number of previous opportunities may be reduced in rank or not shown at all.

The programming guide may include preferences where the user sets permissions (e.g., such as allowing open mike word capture to help determine appropriate content) and may include instructions from the user as to, for example, selection of preferred sources of secondary content, allowable search terms, etc., and/or to what extent does the user want the programming guide to seek additional content—e.g., should the programming guide seek looser connections for a wider variety of potential selections or does the user want to stay very close to highly related material. Such may be termed proximity parameters that the user may select for example on a low to high or 1 to 10 scale. If the user infrequently selects or views secondary content, the system may query the user about whether the current settings should be changed or perhaps remove the secondary content listings.

In one embodiment, selecting secondary content may bring up a new page with information about the content, preview, and, yet further secondary content using the selected content as a base or core for searching the new secondary content listing. Such listing may be similar to selection of (or scrolling over) of a primary content listing.

Advertising contained in banners, pop-ups, mobile device notifications, etc., may be adjusted based on the secondary content. In one embodiment, advertising revenue is generated by the pass through of ads from a content provider (e.g., from YouTube) that forwards a paid advertiser's ad to the programming guide and the ad gets displayed along with (or during an advertising break) of selected or displayed secondary content. The ad may be displayed, for example, in a banner or pop-up on a programming guide where a selected primary content displays secondary content to which the ad is linked, or upon scrolling over the secondary content listing.

Although the programming content, advertisements, banners, pop-ups, and other features/embodiments described above is mainly described in relation to programming guides, or EPGs, the same may be extended to non-programming guide types of installations such as search results from, for example, a website, browser, or online content provider. The same may be provided on a computer, mobile device, or other capable device with or without an underlying primary content (such as provided by subscription to a streaming or cable service), and, as such, may itself be a search engine configured to find content on all various sources and provide options for engaging multiple paid providers for various content including "free" and paid services which may be selected (such as identifying a particular movie or other content available from several sources and cost for each, such as, for example, on a one-time pay-for-play basis) and may be ordered according to any of cost, ratings, views, likes, comments, etc. for example.

Figure 5:
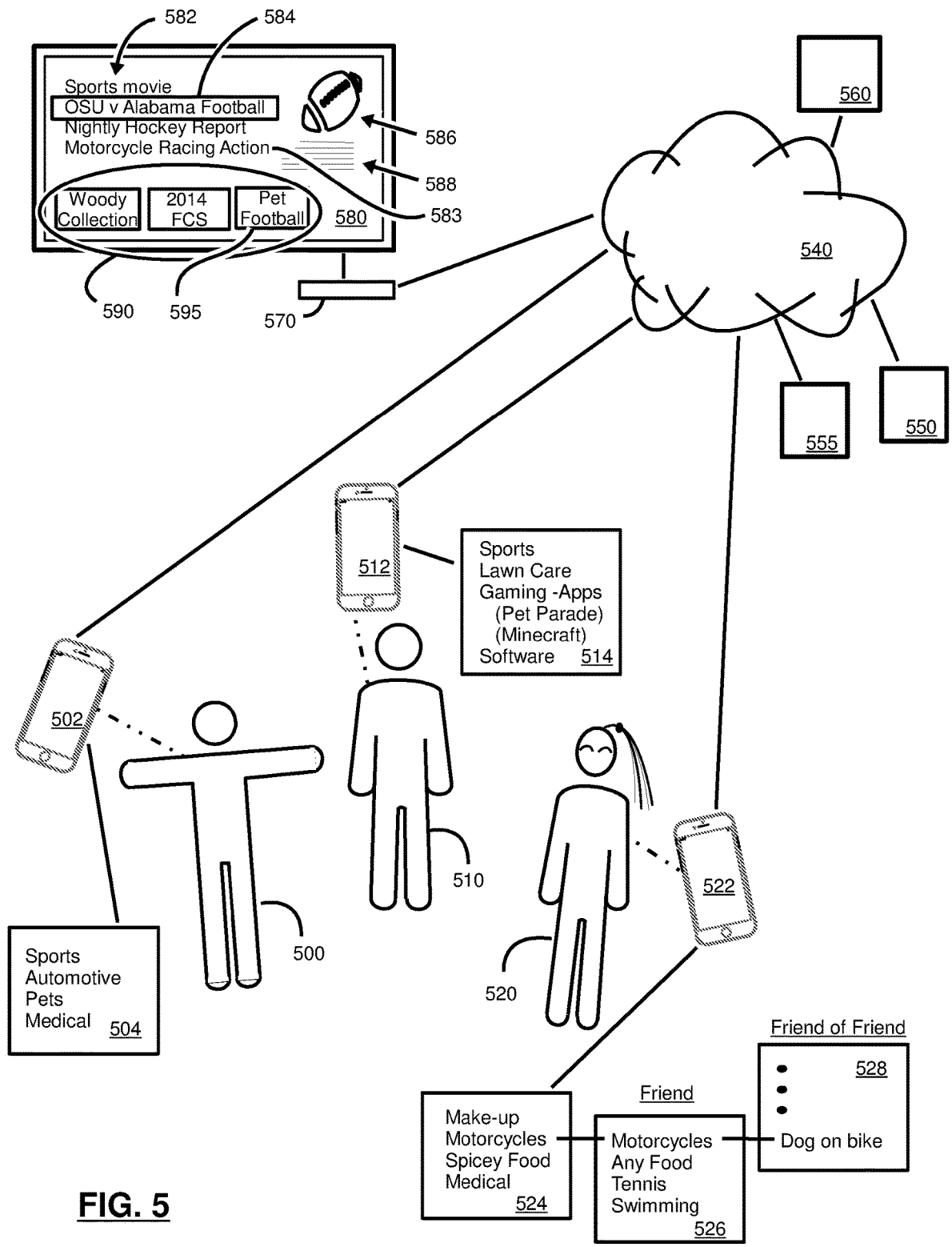
FIG. 5 is a drawing of a search hierarchy and relationships/confluence among users according to an embodiment.

FIG. 5 is a drawing of a search hierarchy and relationships/confluence among users according to an embodiment. User 500 has blockchain or database items 504 associated with his/her personality, activities, likes, and dislikes. The user's mobile device 502 may provide data or assist in gathering data to produce the items.

A crawler 550 may be configured to crawl the user's social media and other relevant web-accessible data to produce the items. A machine learning/AI module 560 may be configured to search for relationships amongst the data/items and similar or related items amongst the user's friends, co-workers, etc. Such relationships may be determined by categorizing words, images, or objects recognized in images, for example. Synonyms or related items may be linked together as similar or the same by, for example, weighting a relationship based on a degree of similarity between the categorized items. Information utilized to determine relationships amongst the items may be location (e.g., one or more users in close proximity—e.g., location services of the mobile device), actions being taken—for example, noting when the user is in action, e.g., participating in a sporting event—which may be a combination of motion of the user (e.g., as recorded by the user's mobile device's Inertial Measurement Unit IMU) and the user's location (at a sporting field, for example).

IoT data may be captured and combined with proximity data from nearby mobile devices to produce an inference that the mobile device's user was interacting with the IoT device. Some IoT devices will register a user, user's mobile device, etc., and some may take images of the user which may be used for identification. Other data may be collected via a crawler on web accessible pages, data accessed (e.g., downloaded) from apps or websites such as Facebook (all with appropriate permissions if applicable), data from games played, etc., any of which may be accessed through the app, the app's website, an API, if available, and/or from files stored on the user's computer or mobile device, for example. Accordingly, User 500 has an items list 504 that includes Sports, Automotive, Pets, and medical. These illustrate for example, that the user recently researched medical items on the Internet, has posted pictures of his pets to social media, owns a special automobile (e.g., expensive sports car), and is an avid watcher of sports on cable TV—all of these being examples and the same, more, or less data may have been derived from different sources than those provided as an example.

Similarly, user 510 (and mobile device 512) are associated with an items list comprising Sports, Lawn Care, Gaming Apps (e.g., Pet Parade, Minecraft), and software, for example. If user 500 and 512 were the only users in the room, a common interest or confluence between the users may be determined by a direct match on their corresponding items lists (e.g., sports). Accordingly, suggested content which may be content on their respective mobile devices or the big screen TV 580, which may be provided, for example, via an EPG displayed on the big screen tv 580 via OTT device/controller 570. The suggested content may be primary or secondary content (e.g., paid content that refers to related secondary content when highlighted).

The OTT device may, for example, provide a display or EPG according to any one or more of the other discussions contained herein or as illustrated on display 580. For example, the first 3 menu items (Sports Movie, OSU Football, and Nightly Hockey Report) on a displayed EPG 582 represent a confluence of the two individuals users 500 and 510 (item 583 has not yet appeared).

User 520 is illustrated with an items list 524 that includes beauty products (make-up), Motorcycles, Spicey Food, and Medical. Upon entering the room, the mix of items between the users (e.g., the confluence) changes. Programming content may now be suggested in relation to all three users. User 520 and user 500 share an item in the Medical category, but it is not shared with User 510. Nonetheless, a strong $1^{st}$ level connection is enough that at least some medical related programming content may be displayed or suggested. However, additional links to show confluence may be found in degrees of separation. For example, User 520 is shown linked to a friend (524-526 link) that has common interest in motorcycles, who is then further linked to a friend of the friend who liked a video of a Dog on a bike (526-528). Although the friend (526) is not in the room, the friend provides the link to potential confluence with the other users, in this case to pets, which is a direct item on user 500's item list. Further user 510, although not directly sharing pet interest, is shown to have played an app that is pet related (Pet Parade). In this manner, searching linked individuals and related websites and other data stronger confluences can be determined over that which is apparent with the user's main interests. Accordingly, an EPG or other content selections or suggestions (both primary and secondary, may include items related to Pets, sports, and medical to more closely match the confluence of users in the TV room.

Taking user 520's items and relationships into account, the EPG 582 may add another item, here Motorcycle Racing Action 583, which is an item related to user 520's items list (524). The full list 582 now represents the confluence of all three users. Further, upon selection of an OSU Football game (e.g., OSU v. Alabama), a preview image 586 and synopsis 588 appear along with a secondary listing 590 that provides a listing of secondary content that relates to the selected item and the confluence of users in the room. The secondary listing may be accounted for or provided, for example, as detailed in a layout file from, for example, a backend 555 as transmitted to the OTT box 570. The backend 555 may be tasked, for example, with forming layout files, and combining results of crawler and AI processing, and ultimately determining or selecting content which may also be transmitted to OTT box 570. The layout file(s) may be, for example, related to or formed from, for example, features provided in a layout file to an individual user's mobile phone which a user may utilize to provide suggestions for overall content. Accordingly, in various embodiments, a layout file is provided constructed to accommodate primary and/or secondary content listings selected from user data derived from activities, interests, likes as reflected by one or more users.

In this example, all items on the secondary listing are football related (which also matches user 500 and user 510's item list as sports), and one of the items is pet football which matches user 500's item list, is related to user 510's item list, and is tangentially related through degrees of separation to user 520's item list. The above may be described as searching multiple degrees of separation (which may be a tree search over all of the user's online and/or physical interactions (e.g., IoT devices)) to establish relations or interest in subjects or topics relevant to the selection of content representing a confluence of the user/viewers present at an entertainment device. Further, in cases where general interests are aligned between various users (e.g., items lists all have at least some common matching items), further searching one or more degrees of separation can help reveal how deeply entrenched the user's interest is on that subject or topic and the searching may be applied to find the common topic of most interest between the users/viewers.

In one embodiment, more personalized EPG's for an individual user/viewer may be displayed on their mobile device and selected items may be put forth onto the EPG 582 as a suggestion for the group. The personalized EFG's may be. for example, detailed in a layout file transmitted to the individual user's mobile device. Data regarding such selections may be considered in the overall content selections (primary and secondary). For example, if one of the user's selects a program out of their general area of interest as may, for example, be detailed in their corresponding item list, the general content may be considered in re-calculating/selecting primary or secondary content for display on the EPG.

Figure 6:
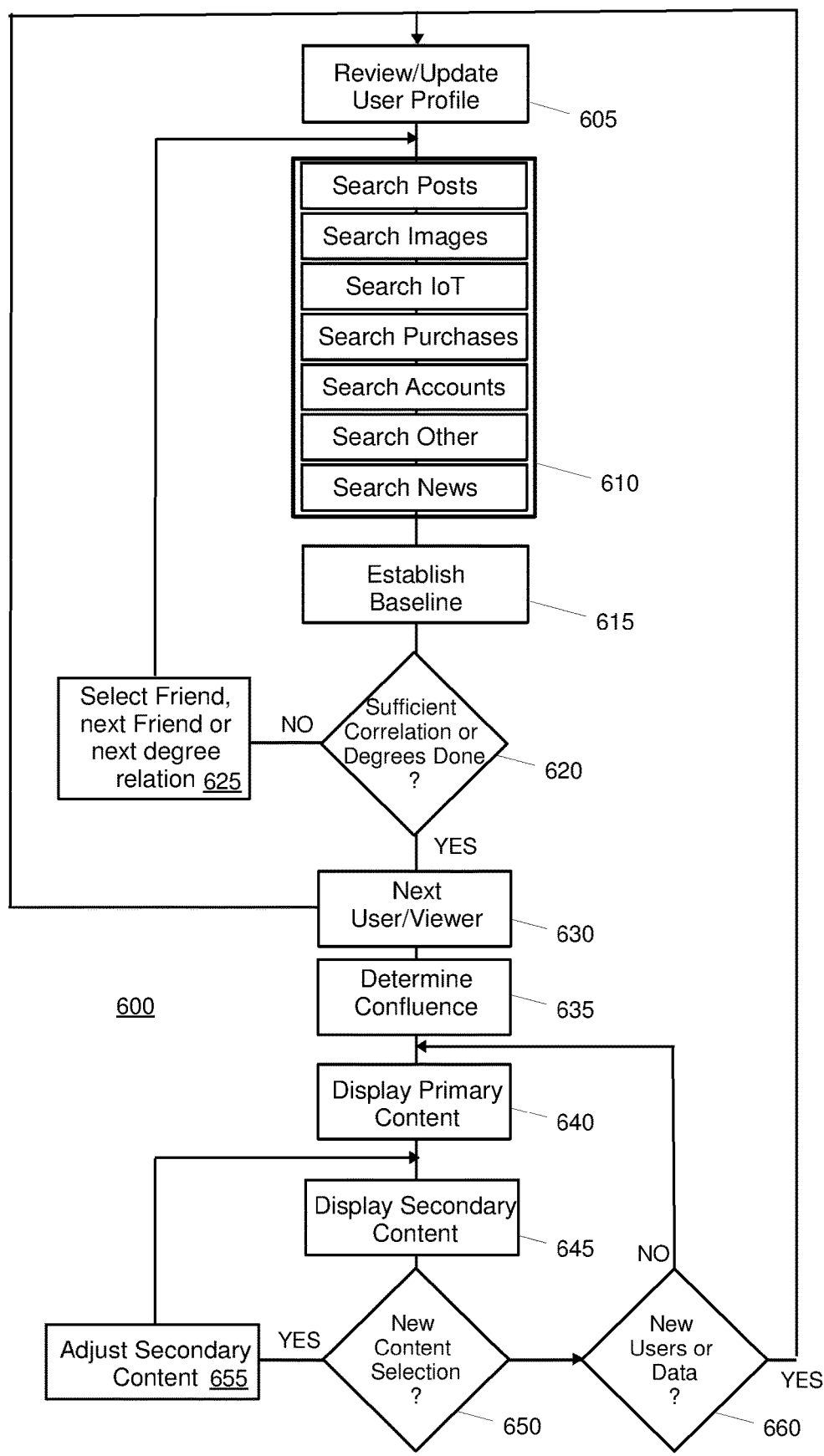
FIG. 6 is flow chart of an embodiment directed to finding confluence among user/viewers for display of primary and secondary content.

FIG. 6 illustrates a flow chart 600 of an embodiment directed to finding confluence among user/viewers for display of primary and secondary content. The flow begins, for example, when an STB or OTT box/service or controller is turned on, registered, or otherwise placed into action initiating a review of current User/viewer's near and/or potentially using the STB/OTT (step 605). At step 610, various characteristics/information related to the user/viewer are searched or reviewed. The characteristics information may include any of the above noted informations related to the user, and may include (but not limited to or required): Posts (e.g., social media posts, product reviews, feedback, comments, etc.), Images posted (e.g. searching objects in images), IoT devices (IoT activity, types of IoT devices recently activated or used, etc.), Purchases (Amazon, eBay, on-line, credit card purchase, retail, etc.), Accounts (social media, payment, newspapers/on-line subscriptions, etc.), Other (e.g., any of the other items described herein containing information about the user), and News, which may be searched for newsworthy topics within in any areas of interest determined by any of the preceding searches or any previously established user baseline. In fact, each search area may be adjusted based on relevant information already known about a particular user/viewer (e.g., weighted more heavily toward well established likes or dislikes).

At step 615, the search information is utilized to establish and/or update a baseline of information about the user. Such baseline may include, for example, direct user inputs prepared in, for example, a preferences file associated with and/or established by the user (e.g., in response to a pop-up invitation, "Hello user, we just noticed you are close to an entertainment device, may use your profile for content selections?", for example). Such invitation may lead to a more detailed menu of opt-in type privacy notices, accounts information, questions about likes or dislikes, and corresponding permissions.

If insufficient information has been collected, or a wider platform is desired, a friend. Next friend, or next degree relation may be selected and similarly searched. Such searching may include reaching out to this next relation for permissions or be maintained within publically accessible sources for which permission is not needed. The information searched may be weighted, for example, a user with interests in motorcycles who also has a number of friends all of whom also share interests in motorcycles, categories related to motorsports and particularly motorcycles may be weighted more heavily than, for example, interest in nature which the user might also have (e.g., weighting particular interests based on the strength of that interest within a circle of friends, family, co-workers, etc.).

If sufficient information is collected (step 620), a next viewer is selected (step 630) and searched until each member of the current group has baselines, and then a confluence amongst the group is determined (step 630). The confluence is, for example, a set of subject areas, or types of content which each viewer has at least some interest, and multiple confluences may be established and weighted giving the strongest confluence the most input (for example) in selection of displayed content selections (e.g., primary content—step 640).

At step 645, secondary content is displayed. The secondary may be selected form the same pool of content as the primary content, or the secondary content may take, for example, a turn from the standard primary content listings. The secondary content may be sources outside the primary content providers direct area of responsibility (e.g., other services, YouTube, Vimeo, Artist/Photography Galleries, etc.). If a primary content item is selected or highlighted by a user (e.g., selected from his/her mobile device, via remote control to OTT box, etc.), the secondary content may be adjusted (step 655) to reflect the selected primary content as an indication of the likes/current persuasion of the group, and such adjustment may include selections of secondary content displayed that are more relevant to the highlighted/selected/touched primary content listing. If secondary content is selected, both primary and secondary content selections may be readjusted. If new users or data becomes available (e.g., new user enters the room, or users makes a post) (step 660), the baselines may be updated or established (e.g., loop back to start).

In describing the embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing a set-top box, database, computer, appliance, blockchain, AI, machine learning, guided learning, etc., any other equivalent device method or process having an equivalent function or capability, whether or not listed herein, may be substituted therewith. Furthermore, the inventors recognize that newly developed technologies not now known may also be substituted for the described parts and still not depart from the scope of the present invention. All other described items, including, but not limited to EPG's, content, IoT devices, displays, rules, Application Layout Files, etc. should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes or functions of the present invention. The storage medium can include, but is not limited to, any type of disk including floppy disks, mini disks (MD's), optical discs, DVD, cloud devices, cloud storage, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, identification and retrieval of relevant content personalized for a user or group of users, securely collecting and transmitting IoT and other data relevant to the identification process, accounting, and use of the content, and the display, storage, or communication of results according to the processes of the present invention.

The present invention may suitably comprise, consist of, or consist essentially of, any of element (the various parts or features of the invention and/or their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed is:

1. A method comprising:
   transmitting, by a computing device, content to one or more user devices and respective users;
   retrieving, by the computing device from one or more sources, an application layout file associated with a feature related to the content;
   customizing, by the computing device, the application layout file to generate one or more customized application layout files each configured for a respective device platform, wherein each of the one or more customized application layout files comprising a structure that indicates attributes of display layout data for rendering the feature related to the content for the respective device platform; and
   transmitting, by the computing device, the one or more customized application layout files to at least one of the user devices each implementing one of the plurality of device platforms to allow each of the user devices to access the feature related to the content;
   wherein content of a program guide comprises a selection based on data reflecting a confluence of the users including data collected from social media that is weighted wherein higher amounts of activity and active engagement with respect to the collected data are weighted higher than lower amounts and past engagements.

2. The method according of claim 1, wherein the content comprises advertising selected via an Artificial Intelligence (AI) program.

3. The method according to claim 2, wherein content of a program guide comprises content modified in a guided learning environment intended to produce program guide content that appeals to at least one user.

4. The method according to claim 1, wherein the content for the respective device platform is selected using data about a user of the device platform and/or activities of the user contained in blockchain comprising data from at least one IoT device.

5. The method according to claim 1, wherein the content is determined based on user data authorized by a corresponding user via a privacy statement comprising a multi-level privacy-by-design opt-in format.

6. The method according to claim 1, wherein the structure's attributes comprise a general location and allows the receiving device to effect actual placement and at least one attribute is generated on an AI based platform.

7. The method according to claim 1, wherein the step of transmitting comprises transmitting over different networks to different user devices, the method further comprising a step of modifying presented content for each user according to each user.

8. The method according to claim 7, wherein one user device is transmitted to via a mobile phone network not used by the other networks to receive the content, another device is transmitted to via a mobile data network not used by the other devices to receive the content, yet another device is transmitted to via a Wi-Fi network not utilized by the other devices to receive the content, yet still another device is transmitted to via a cable television-like network not utilized by the other devices to receive the content but may be (or intended to be utilized) by the other user's to view the content on a larger screen than the other devices.

9. The method according to claim 7, wherein the files are constructed and/or arranged based on rules verified over a large dataset of the same and other user selections and performance correlated to the user.

10. The method according to claim 7, wherein the customized application layout file is customized for different users and each users' devices in close proximity.

11. The method according to claim 7, wherein the differences in content between users comprises adjustments or layout derived from a deep learning or machine learning environment that takes a user's emotion state into account.

12. The method according to claim 1, wherein content of a program guide comprises a selection based on data reflecting a confluence of the users consistent with each user's preferences.

13. The method according to claim 1, wherein content of a program guide comprises advertising.

14. The method according to claim 13, wherein the content is consistent with each user's privacy policies.

15. The method according to claim 14, wherein the users' privacy policies comprise a multi-level opt-in strategy explaining the use of the data in the selection of content to be presented to the user.

16. The method according to claim 1, further comprising the steps of:
   receiving a permission from a user to share personal data; and
   providing the personal data.

17. The method according to claim 16, wherein the personal data comprises content to be displayed.

18. The method according to claim 16, wherein the personal data is utilized in selecting appropriate content.

19. The method according to claim 1, further comprising the steps of:
updating user information; and
selecting the content based on the users' updated information;
wherein the content comprises advertising modified based on the personal data and a confluence of the users including conversations the users are participating in when the content is selected.

20. A method comprising:
transmitting, by a computing device, content to one or more user devices each having a respective user;
retrieving, by the computing device from one or more sources, an application layout file associated with a feature related to the content;
customizing, by the computing device, the application layout file to generate one or more customized application layout files each configured for a respective device platform, wherein each of the one or more customized application layout files comprising a structure that indicates attributes of display layout data for rendering the feature related to the content for the respective device platform and user; and
transmitting, by the computing device, the one or more customized application layout files to at least one of the user devices each implementing one of the plurality of device platforms to allow each of the user devices to access the feature related to the content;
wherein content of a program guide comprises a selection based on data reflecting a confluence of the users including data collected from social media that is weighted wherein higher amounts of activity and active engagement with respect to the collected data are weighted higher than lower amounts and past engagements.

* * * * *